United States Patent
Chen (10) Patent No.: US 11,317,008 B2
(45) Date of Patent: Apr. 26, 2022

(54) METHOD AND APPARATUS FOR REMOVING VIDEO JITTER

(71) Applicant: ALIBABA GROUP HOLDING LIMITED, Grand Cayman (KY)

(72) Inventor: Ruizhi Chen, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 17/106,682

(22) Filed: Nov. 30, 2020

(65) Prior Publication Data

US 2021/0084198 A1  Mar. 18, 2021

Related U.S. Application Data

(63) Continuation of application No. PCT/CN2019/087693, filed on May 21, 2019.

(30) Foreign Application Priority Data

May 31, 2018 (CN) .......................... 201810554266.9

(51) Int. Cl.
*H04N 5/213* (2006.01)
*G06T 7/00* (2017.01)
*G06T 5/00* (2006.01)

(52) U.S. Cl.
CPC ............. *H04N 5/213* (2013.01); *G06T 5/003* (2013.01); *G06T 7/97* (2017.01); *G06T 2207/10016* (2013.01)

(58) Field of Classification Search
CPC . H04N 5/213; G06T 7/97; G06T 2207/10016; G06T 5/003
See application file for complete search history.

(56) References Cited

U.S. PATENT DOCUMENTS 7,369,741 B2 * 5/2008 Reagan ................ G02B 6/4452
                                                    385/139
8,797,414 B2 * 8/2014 Park ........................ G06T 7/238
                                                    348/208.3

(Continued)

FOREIGN PATENT DOCUMENTS

CN        102473294 A        5/2012
CN        103927731 A        7/2014

(Continued)

OTHER PUBLICATIONS

PCT International Search Report and Written Opinion dated Jul. 29, 2019 issued in corresponding International Application No. PCT/CN2019/087693 (14 pgs.).

(Continued)

*Primary Examiner* — Brian P Yenke
(74) *Attorney, Agent, or Firm* — Finnegan, Henderson, Farabow, Garrett & Dunner, LLP (57) ABSTRACT

Embodiments of the present disclosure provide methods and apparatuses for removing video jitter. The method can include: determining position information of feature point pairs in each pair of raw images according to position information of feature point pairs in each pair of compressed images, wherein one feature point pair is composed of two corresponding feature points on two consecutive images in each pair of images, and the raw images are uncompressed images; determining position change information of a subsequent image relative to a preceding image in each pair of raw images according to the position information of the feature point pairs in each pair of raw images; acquiring deformation information corresponding to the preceding image in a m-th pair of raw images according to the position change information of the subsequent image relative to the preceding image inn pairs of raw images, wherein n and m are positive integers, and m is not greater than n; and (Continued)

deforming the preceding image in the m-th pair of raw images according to the deformation information corresponding to the preceding image in the m-th pair of raw images for removing jitter in the preceding image in the m-th pair of raw images.

20 Claims, 7 Drawing Sheets

(56) References Cited

U.S. PATENT DOCUMENTS

| | | | | |
|---|---|---|---|---|
| 9,277,129 | B2* | 3/2016 | Klivington | G06T 7/262 |
| 9,661,228 | B1* | 5/2017 | Klivington | G06T 7/248 |
| 9,838,604 | B2* | 12/2017 | Schlattmann | G06T 7/33 |
| 10,303,925 | B2* | 5/2019 | Hart | G06F 16/5854 |
| 10,425,582 | B2* | 9/2019 | Kopf | G06T 5/50 |
| 10,447,926 | B1* | 10/2019 | Brailovskiy | H04N 5/23238 |
| 10,880,458 | B2* | 12/2020 | Zhu | G06T 5/50 |
| 2003/0038803 | A1* | 2/2003 | Morein | G06T 15/405 |
| | | | | 345/421 |
| 2005/0036658 | A1* | 2/2005 | Gibbins | G06T 7/277 |
| | | | | 382/103 |
| 2010/0092100 | A1* | 4/2010 | Madnani | G06T 7/0002 |
| | | | | 382/255 |
| 2012/0300030 | A1* | 11/2012 | Paczkowski | H04N 19/182 |
| | | | | 348/43 |
| 2014/0362240 | A1* | 12/2014 | Klivington | G06T 5/50 |
| | | | | 348/208.1 |
| 2015/0262336 | A1* | 9/2015 | Jin | G06T 7/269 |
| | | | | 382/275 |
| 2017/0126977 | A1* | 5/2017 | Klivington | G06T 7/248 |
| 2019/0147606 | A1* | 5/2019 | Zhuang | H04N 13/282 |
| | | | | 348/47 |
| 2020/0076990 | A1* | 3/2020 | Zhu | G06T 5/002 |
| 2020/0327692 | A1* | 10/2020 | Lin | G06T 7/246 |
| 2021/0227139 | A1* | 7/2021 | Wang | G06T 7/246 |

FOREIGN PATENT DOCUMENTS

| | | |
|---|---|---|
| CN | 106878612 A | 6/2017 |
| CN | 107705288 A | 2/2018 |
| WO | WO 2019/228219 A1 | 12/2019 |

OTHER PUBLICATIONS

Guo et al., "Joint Video Stitching and Stabilization from Moving Cameras," IEEE Transactions on Imaging Processing, vol. 25, No. 11, pp. 5491-5503 (2016).

First Chinese Search Report issued in corresponding Chinese Application No. 201810554266.9 dated Mar. 19, 2020 (2 pages).

First Chinese Office Action issued in Chinese Application No. 201810554266.9 dated Mar. 27, 2020, 10 pages.

* cited by examiner

METHOD AND APPARATUS FOR REMOVING VIDEO JITTER

CROSS-REFERENCE TO RELATED APPLICATION

The present disclosure claims the benefits of priority to International Application No. PCT/CN2019/087693, filed on May 21, 2019, which claims priority to Chinese Patent Application No. 201810554266.9, filed on May 31, 2018, both of which are incorporated herein by reference in their entireties.

BACKGROUND

A video with a length of a period of time is formed by many frames of images that change rapidly and continuously. When a video is taken, the relative movement between a video capture device and a scene can cause a relatively large displacement between the taken images that change rapidly, the video can be jittery. Conventional video jitter removing solutions cannot meet the requirements for real-time processing of live video and short videos.

SUMMARY

Embodiments of the present disclosure provide methods and apparatuses for removing video jitter. The method can include: determining position information of feature point pairs in each pair of raw images according to position information of feature point pairs in each pair of compressed images, wherein one feature point pair is composed of two corresponding feature points on two consecutive images in each pair of images, and the raw images are uncompressed images; determining position change information of a subsequent image relative to a preceding image in each pair of raw images according to the position information of the feature point pairs in each pair of raw images; acquiring deformation information corresponding to the preceding image in a m-th pair of raw images according to the position change information of the subsequent image relative to the preceding image in n pairs of raw images, wherein n and m are positive integers, and m is not greater than n; and deforming the preceding image in the m-th pair of raw images according to the deformation information corresponding to the preceding image in the m-th pair of raw images for removing jitter in the preceding image in the m-th pair of raw images.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings.

DETAILED DESCRIPTION

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

As stated above, conventional video jitter removing solutions cannot meet the requirements for real-time processing of live video and short videos. Embodiments of the present application overcome these issues by removing video jitter in a manner to allow for real-time processing of live video and short videos.

Figure 1:
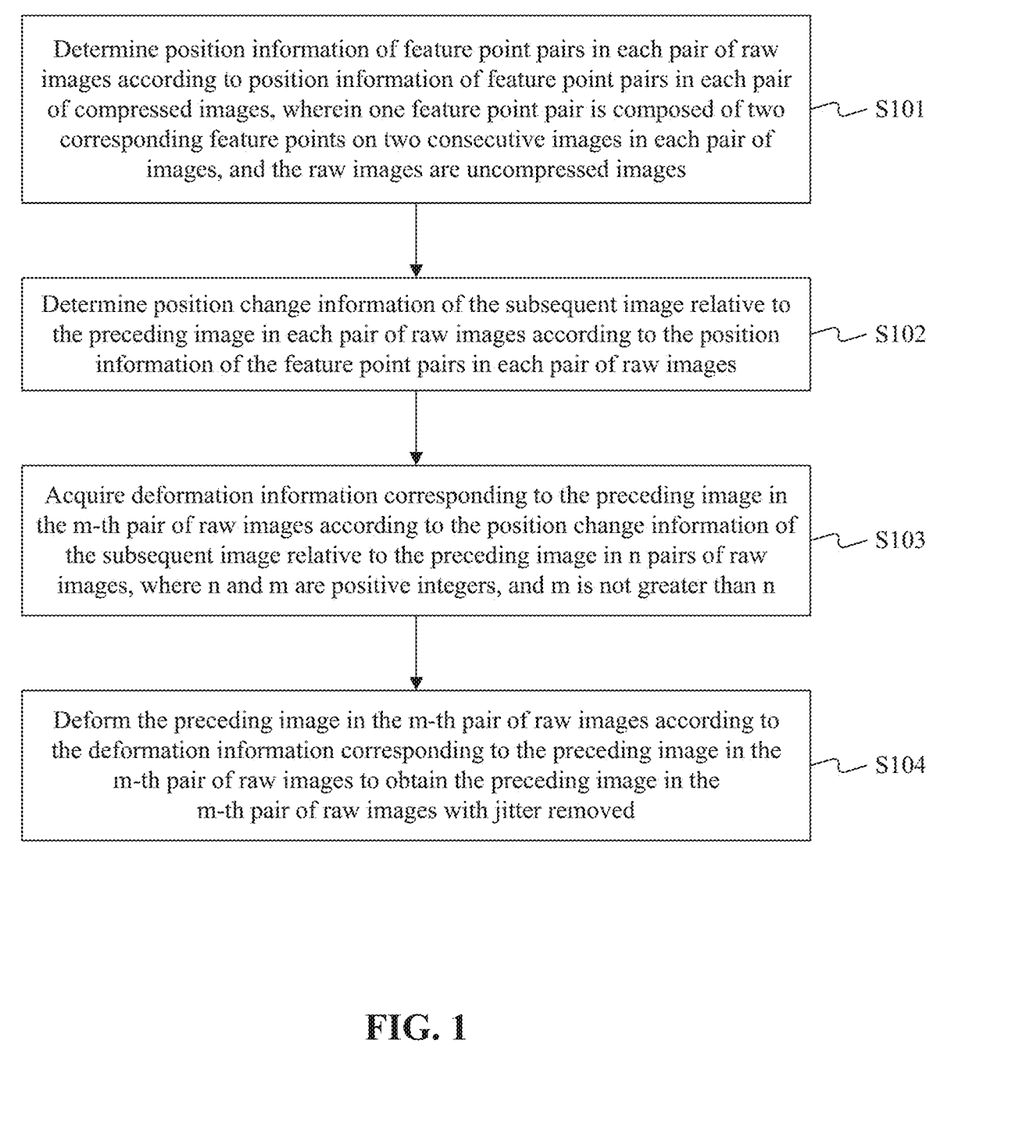
FIG. 1 is a flowchart of an exemplary method for removing video jitter, consistent with some embodiments of the present disclosure.

FIG. 1 is a flowchart of an exemplary method for removing video jitter, consistent with some embodiments of the present disclosure. The technical solution provided by the embodiments of the current disclosure aims to address a jitter problem of a video in real time. The method can include the following steps.

In step S101, position information of feature point pairs in each pair of raw images is determined according to position information of feature point pairs in each pair of compressed images, wherein one feature point pair is composed of two corresponding feature points on two consecutive images in each pair of images.

In step S101, the position information of the feature point pairs in each pair of uncompressed raw images is determined through the position information of the feature point pairs in each pair of compressed images. The method can include step S100 (not shown) prior to S101. In step S100, the position information of the feature point pairs in each pair of compressed images is acquired.

Step S100 can specifically include the following steps.

Figure 4:
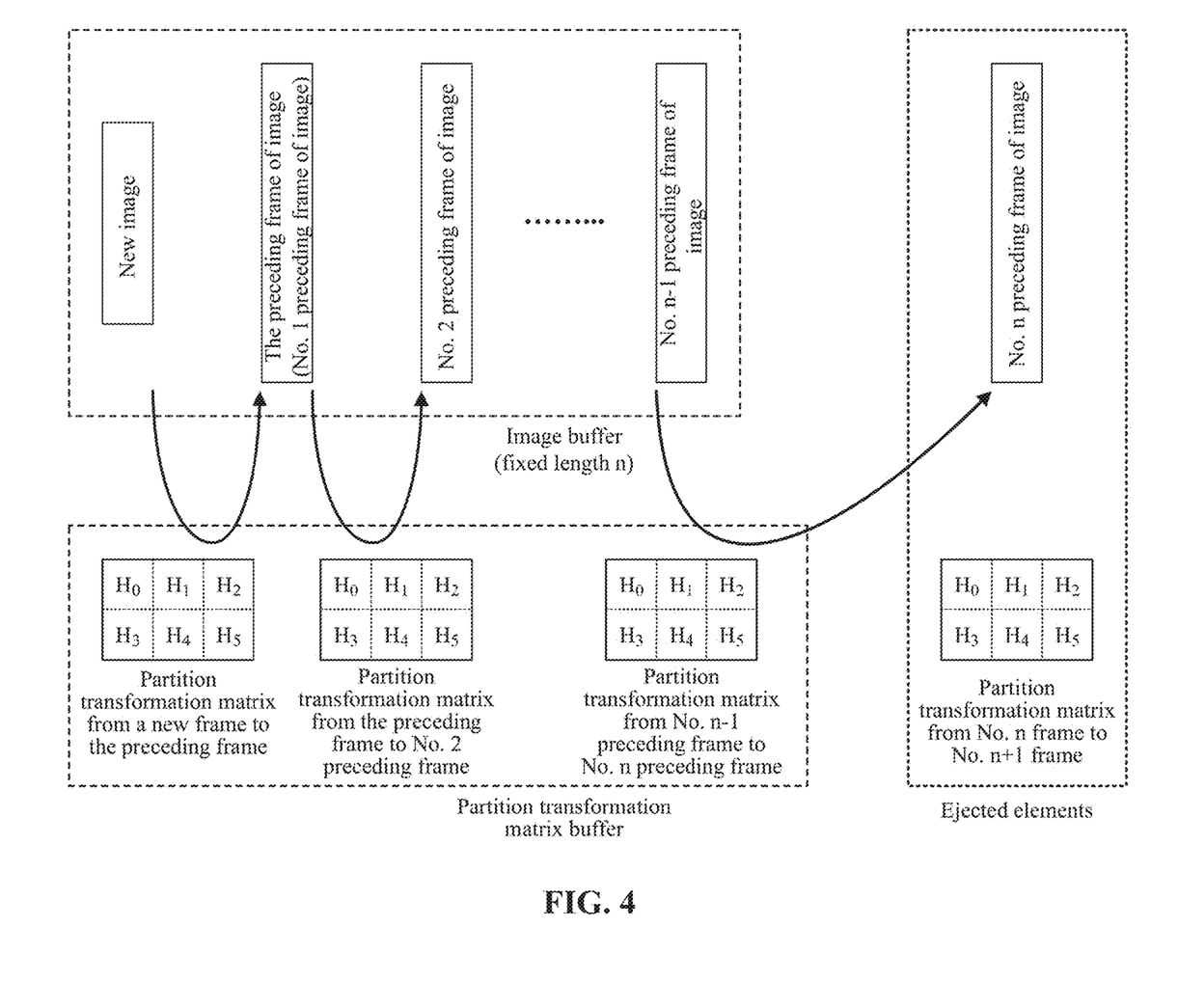
FIG. 4 is a schematic diagram of an exemplary relationship between each image and corresponding partition transformation matrices, consistent with some embodiments of the present disclosure.

In step S100-1, the raw images are stored into a first queue. When multiple frames of images are taken within a period of time using the video taking device, the multiple frames of images are arranged in the first queue in sequence, and every two adjacent frames of images are a pair of images, where the first one is a preceding image, and the last one is a subsequent image. The queue can be specifically implemented in an image buffer. The image buffer refers to a memory, in a computer system, dedicated to storing images being synthesized or displayed. An exemplary image buffer is shown in FIG. 4.

In step S100-2, each pair of raw images is compressed by a factor of a number.

Figure 2:
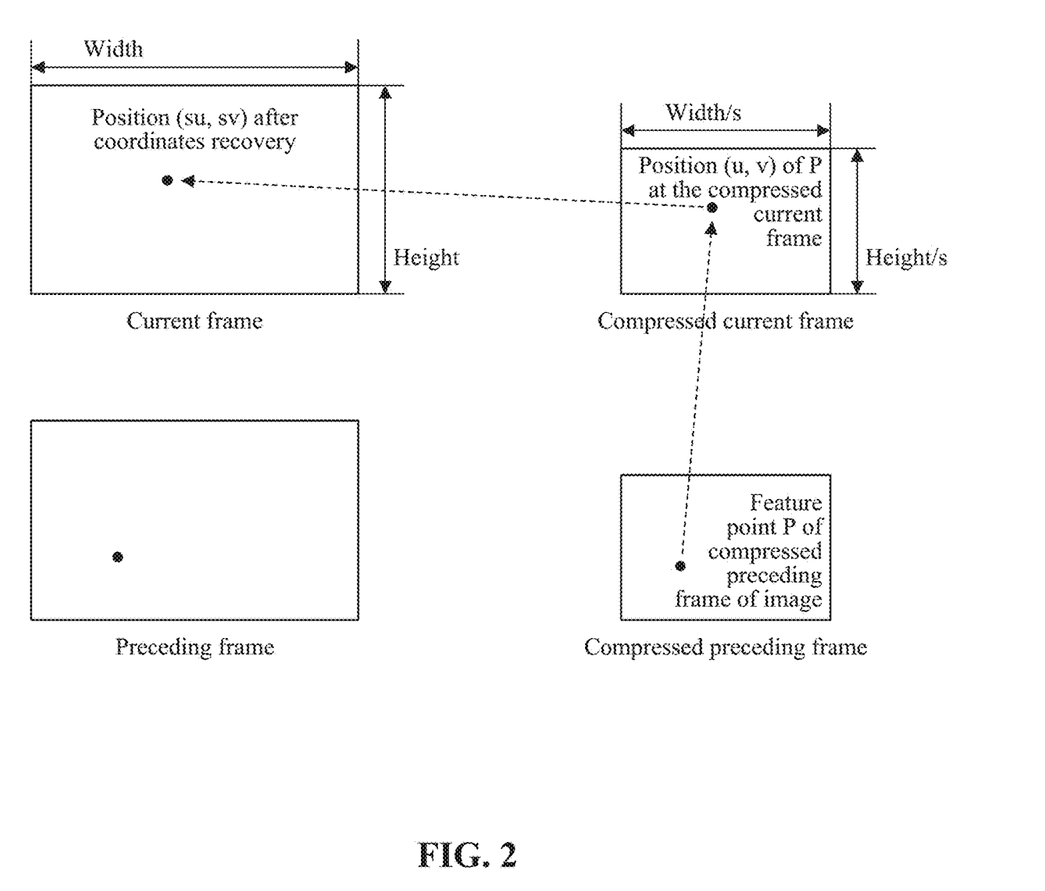
FIG. 2 is a schematic diagram of exemplary feature points, consistent with some embodiments of the present disclosure.

In the process of quickly removing the jitter of the several frames of images in a video of a period of time, the raw images can be compressed by a factor of the number, and the number can be a preset value. For example, each pair of raw images can be compressed by a factor of 3. Compared with the uncompressed image, the compressed image is smaller by a factor of the number (e.g., smaller by a factor of 3), and an electronic device can process faster, so that every time a new image is captured and compressed, the subsequent steps can be quickly performed, such as: determining feature points on the new image and position information of each feature point. The two images on the right in FIG. 2 are the compressed preceding frame of image and the compressed current frame of image. The width and height of the preceding and current frames of images before compression on the left can be less than the width and height of the current frame of image and the preceding frame of image after compression on the right a factor of the number (e.g., less by a factor of 3).

In step S100-3, feature points on each of consecutive images in each pair of compressed images are determined.

The feature points refer to a series of pixels on the images that can characterize the contours, appearance and other features of the scene taken. Usually, this series of points can have relatively obvious features, for example, the gray value is relatively large, that is, the image at the point is relatively dark, and the point can be determined as a feature point. For example, if a point P on the compressed current frame in FIG. 2 can characterize the features of the scene taken, then the point P can be used as a feature point on the compressed current frame of image.

In step S100-4, two corresponding feature points on each of consecutive images in each pair of compressed images are determined as a feature point pair.

Each of the consecutive images has its own series of several feature points, where a certain feature point on the preceding image can have a corresponding feature point on the subsequent image. For example, if the two corresponding feature points both characterize a certain point of the taken scene on the image, the two corresponding feature points constitute a feature point pair. As shown in FIG. 2, the feature point P on the compressed current frame and the feature point P on the compressed preceding frame of image both characterize the same feature point of the scene taken, then these two corresponding feature points constitute a feature point pair.

In step S100-5, the position information of the feature point pairs in each pair of compressed images is determined.

The position information of the feature point pairs refers to the relative positions of the two corresponding feature point pairs in the corresponding images, and the position information can be coordinates of the feature points on the corresponding images. For example, the position coordinates of the feature point P on the compressed current frame in FIG. 2 are (u, v). In addition, the corresponding feature point P on the compressed preceding frame of image also has coordinate values. The position information of the two feature points on the respective images is the position information of one feature point pair on the pair of images. There are multiple feature point pairs on the two compressed images adjacent to each other, so the position information of the multiple feature point pairs on the images that are adjacent to each other can be acquired.

After step S100 is performed, that is, after the step of acquiring the position information of the feature point pairs in each pair of compressed images, step S101 of FIG. 1 can be performed: the position information of the feature point pairs in each pair of raw images is determined according to the position information of the feature point pairs in each pair of compressed images.

Since the compressed current frame of image and the preceding frame of image are compressed by a factor of the number of the uncompressed raw images, after the position information of the feature point pairs in each pair of compressed images is acquired, that is, after the position information of the feature points on each image in each pair of compressed images is obtained, as long as the position information of the feature points on each image in each pair of compressed images is expanded by a factor of the number (e.g., expanded by a factor of 3), the position information of the feature points on each image in each pair of uncompressed images can be obtained, which is the position information of the feature point pairs formed by the feature points in each pair of images. For example, in FIG. 2, the coordinates (u, v) of the feature point P on the current compressed image are expanded by a factor of the number (e.g., expanded by a factor of 3), and the coordinates (su, sv) of the feature point P on the uncompressed current frame of image can be obtained. In the same way, the coordinates of the feature point P on the compressed preceding frame of image are expanded by a factor of the number (e.g., expanded by a factor of 3), and the coordinates of the feature point P on the uncompressed preceding frame of image can also be obtained. The two corresponding feature points P in the compressed current frame and the compressed preceding frame constitute a feature point pair P in the compressed current and preceding frames of images. The two corresponding feature points P in the uncompressed current frame and the uncompressed preceding frame constitute a feature point pair P in the uncompressed current and preceding frames.

In step S102, position change information of the subsequent image relative to the preceding image in each pair of raw images is determined according to the position information of the feature point pairs in each pair of raw images.

In step S102, each pair of raw images can be divided into multiple partitions. The position change information from a certain partition on the current frame of image to a corresponding partition on the preceding frame of image is determined. The position change information of the divided several corresponding partitions combined is the position change information from the current frame of image to the preceding frame of image in each pair of images.

Figure 3:
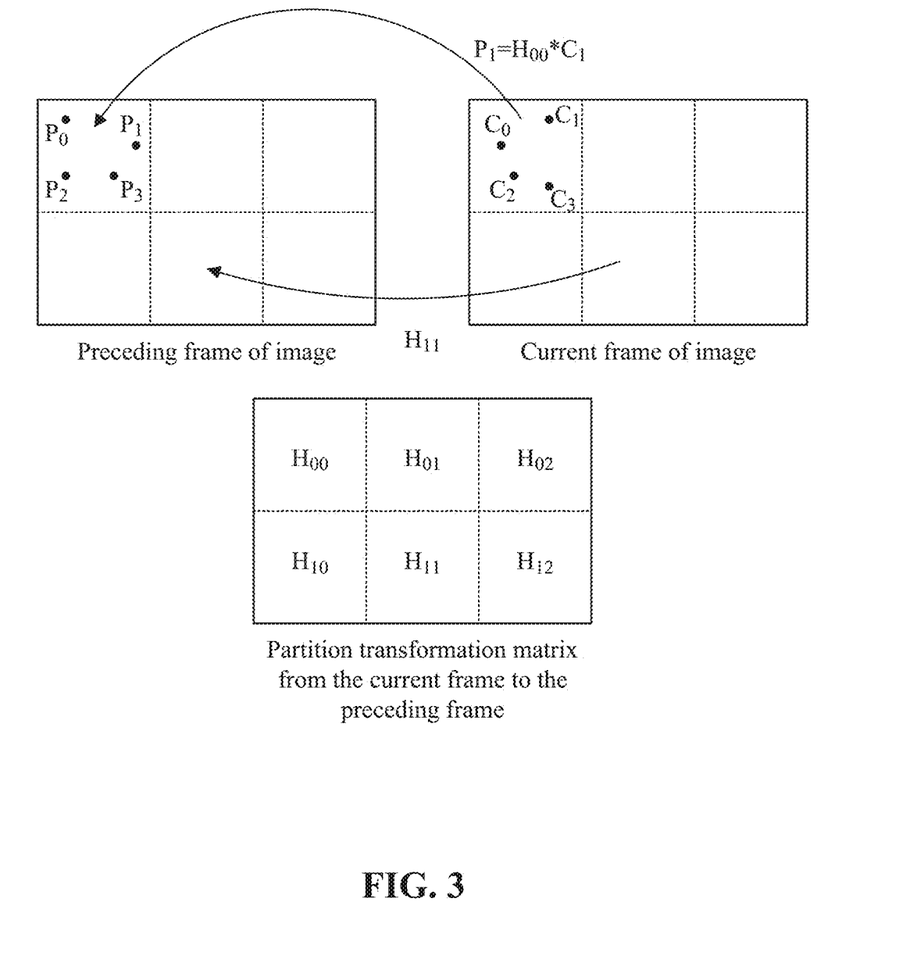
FIG. 3 is a schematic diagram of an exemplary partition transformation matrix, consistent with some embodiments of the present disclosure.

Specifically, step S102 can include the following steps:

In step S102-1, each of consecutive images in each pair of raw images is partitioned; and as shown in the example of FIG. 3, both the current frame of image and the preceding frame of image are divided into six partitions. Among them, four feature points are illustrated in the partition at the upper left corner of the current frame of image: $C_0$、$C_1$、$C_2$、$C_3$, and four corresponding feature points $P_0$、$P_1$、$P_2$、$P_3$ are also illustrated on the preceding frame of image.

In step S102-2, the position change information from the corresponding partition of the subsequent image to the corresponding partition of the preceding image in each pair of raw images is determined according to the position information of each feature point pair in the corresponding partition of each pair of raw images.

Due to the relative movement of the two consecutive images, the position information of the feature points on the subsequent image is different from the position information of the corresponding feature points on the preceding image, and position information difference between the position of the feature points on the subsequent image and that of the corresponding feature points on the preceding image is the position change information from the feature points on the subsequent image to the corresponding feature points on the preceding image. The difference between the position information of each feature point of the corresponding partition on the subsequent image and the position information of each corresponding feature point of the corresponding partition on the preceding image is the position change information from the corresponding partition of the subsequent raw image to the corresponding partition of the preceding raw image. For example, the preceding frame of image in FIG. 3 has 4 feature points $P_0$, $P_1$, $P_2$, $P_3$, and these 4 feature points respectively correspond to the corresponding 4 feature points $C_0$, $C_1$, $C_2$, $C_3$ on the current frame of image. As mentioned earlier, the 4 feature points on the preceding frame of image and the 4 feature points on the current frame of image all characterize the same feature of the scene taken, so the 4 points on the two consecutive images correspond to each other to constitute 4 feature point pairs. In the case where there are 4 feature points in the partition example at the upper left corner of the preceding frame of image, the position information of these 4 feature points $P_0$, $P_1$, $P_2$, $P_3$ constitutes a matrix corresponding to the partition at the upper left corner of the preceding frame of image. Similarly, the position information of 4 points $C_0$, $C_1$, $C_2$, $C_3$ on the current frame of image constitutes the corresponding matrix of the partition at the upper left corner of the current frame of image. A transformation matrix can be determined to represent transformation from the matrix corresponding to the partition at the upper left corner of the current frame to the matrix corresponding to the partition at the upper left corner of the preceding frame of image. The transformation matrix is the position change information or the position change matrix from the partition at the upper left corner of the current frame of image to the partition at the upper left corner of the preceding frame of image. In FIG. 3, the position change information or the position change matrix $H_{00}$ from the partition at the upper left corner in the current frame of image to the partition at the upper left corner in the preceding frame of image is illustrated. That is, the position information or matrix corresponding to each feature point in the upper left corner of the current frame of image can be multiplied by the position change matrix $H_{00}$ to calculate the position information corresponding to each feature point in the upper left corner of the preceding frame of image. Accordingly, the feature point $C_1$ in the partition at the upper left corner of the current frame of image can be multiplied by a value at the corresponding position in $H_{00}$ to obtain the position information of the corresponding feature point $P_1$ in the partition at the upper left corner of the preceding frame of image. Similarly, the position change information from the partition at the lower left corner of the current frame of image to the partition at the lower left corner of the preceding frame of image can be expressed as $H_{10}$. The position change information between the other four corresponding partitions can be expressed as $H_{01}$, $H_{02}$, $H_{11}$, $H_{12}$ in turn.

In step S102-3, according to the position change information of the corresponding partition of the subsequent raw image relative to the corresponding partition of the preceding raw image in each pair of raw images, the position change information of the subsequent image relative to the preceding image in each pair of raw images is determined.

Based on step S102-2, the position change information $H_{00}$, $H_{01}$, $H_{02}$, $H_{10}$, $H_{11}$, $H_{12}$ from each partition of the current frame of image to each corresponding partition of the preceding frame of image has been obtained, and the position change information corresponding to each partition can be combined to characterize the position change information of the current frame of image to the preceding frame of image, and the partition transformation matrix from the current frame to the preceding frame as illustrated in FIG. 3 is the position change information from the current frame of image to the preceding frame of image.

In step S102-4, the position change information of the subsequent image relative to the preceding image in each pair of raw images is stored into a second queue.

After the position change information from the current frame of image to the preceding frame of image is obtained based on step S102-3, the position change information between the pair of images can be stored into a queue, which can be referred to as the second queue. The queue can be specifically stored by a partition transformation matrix buffer. The partition transformation matrix buffer can be a memory, in a computer system, dedicated to storing transformation matrices. An exemplary partition transformation matrix buffer is shown in FIG. 4.

In step S103, deformation information corresponding to the preceding image in the m-th pair of raw images is acquired according to the position change information of the subsequent image relative to the preceding image in the n pairs of raw images, where n and m are positive integers, and m is not greater than n.

The following example illustrates how to implement step S103, that is, taking m=1 as an example, how to acquire the deformation information corresponding to the preceding image in the first pair of raw images. To acquire the deformation information corresponding to the preceding image in the first pair of raw images, it is necessary to use the position information stored in an original path buffer, an optimized path temporary register and an optimized path buffer in a deformation matrix iterative optimizer for processing, and the role of each buffer in this step is introduced below.

Figure 5:
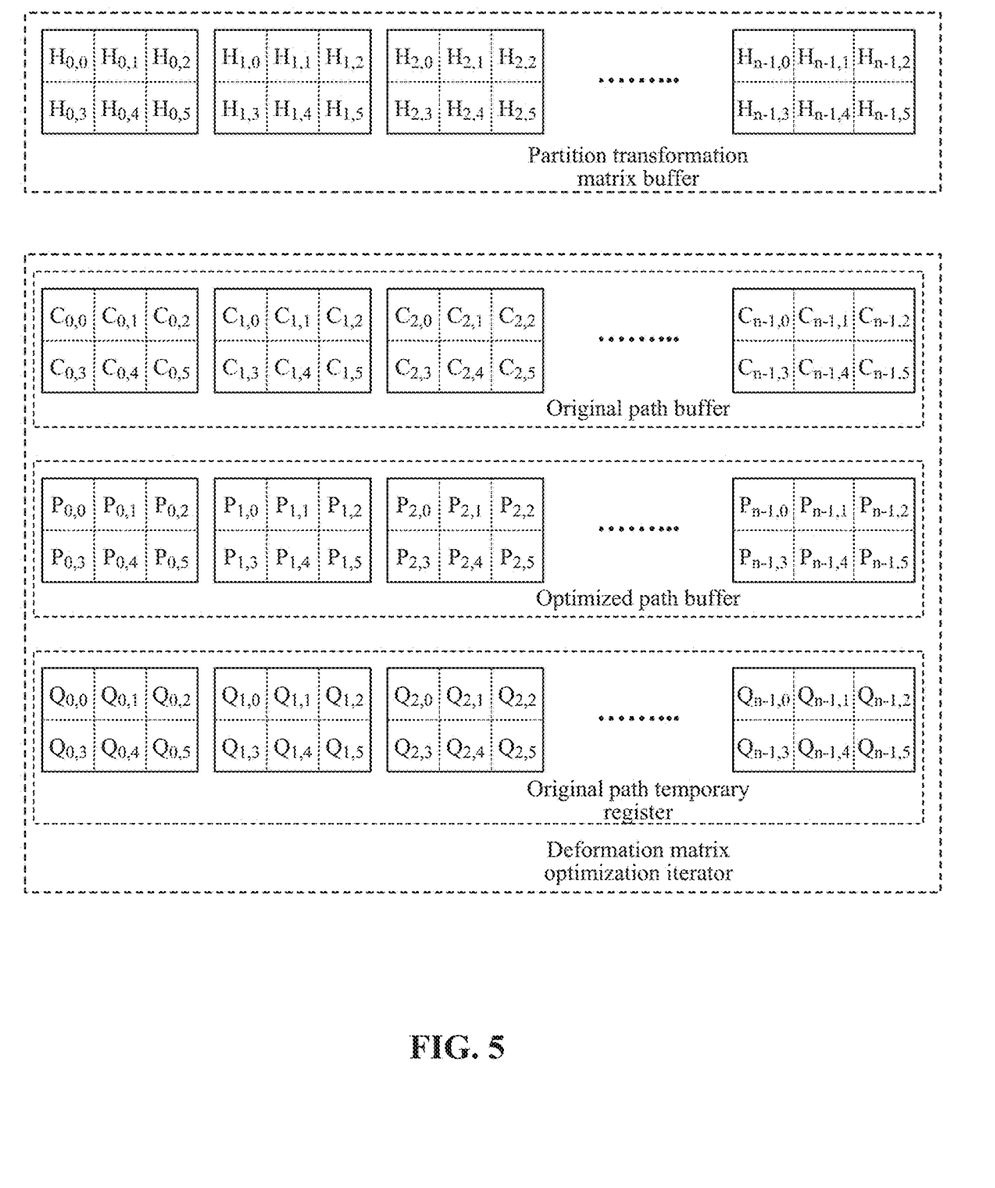
FIG. 5 is a schematic diagram of exemplary matrices used for acquiring a deformation matrix, consistent with some embodiments of the present disclosure.

As shown in FIG. 5, the position change information of the subsequent image relative to the preceding image is stored in the partition transformation matrix buffer. The partition transformation matrix buffer can store the position change information between a certain number of images. The position change information between the certain number of images is stored in the order of generation, and the position change information between the images generated later is arranged at the end of the partition transformation matrix buffer. The partition transformation matrix buffer illustrated in FIG. 5 can store the corresponding position change information between n pairs of images, that is, it stores n position change information or position change matrices. The rightmost set of partition transformation matrices in FIG. 5 represents the position change matrices between the first image and the second image. The first image and the second image are collected by an image collector in the first place. The leftmost set of partition transformation matrices in FIG. 5 represents the position change matrices between the last image and the preceding image.

The partition transformation matrix buffer shown in FIG. 5 has a fixed length, that is, it can store n position change information at most. Correspondingly, the image buffer in FIG. 4 also has a fixed length, and the length of the image buffer is the same as the length of the partition transformation matrix buffer, that is, the image buffer can store n images at most. When the partition transformation matrix buffer is full of n position change information or position change matrices, and when the image buffer is full of n images, the following step is triggered: acquiring the deformation information corresponding to the preceding image in the first pair of raw images. For example, the first queue in the image buffer illustrated in FIG. 4 can store n images, a pair of the first image and the second image that is acquired in the first place is the first pair of images, and the sequence numbers of the first pair of images in the image buffer are n−1 and n−2. The first image is image no. n−1 and the second image is image no. n−2. The deformation information corresponding to the preceding image in the first pair of raw images is acquired. The deformation information corresponding to the frame of image with the sequence number of n−1 in the image buffer is acquired.

After the step of acquiring the deformation information corresponding to the preceding image in the first pair of raw images, the following steps can be further performed: before new images are stored in the first queue, the image at the head of the first queue is taken out; and before position change information of the new images is stored in the second queue, the position change information at the head of the second queue is taken out. After the image at the head of the queue is taken out of the image buffer and the position change information at the head of the queue is taken out of the partition transformation matrix buffer, positions can be freed for the storage of the new images and the storage of new position change information.

In FIG. 5, $H_{n-1,0}$ represents the first partition position change information in the position change information at the head of the second queue storing the position change information, $H_{n-1,1}$ represents the second partition position change information, and so on, $H_{n-1,5}$ represents the sixth partition position change information. Similarly, $H_{0,0}$ represents the first partition position change information in the position change information at the tail of the second queue storing the position change information, $H_{0,1}$ represents the second partition position change information, and so on, $H_{0,5}$ represents the sixth partition position change information.

In FIG. 5, the original path buffer stores a product of certain partition position change information in the newly stored position change information in the second queue and the corresponding partition position change information in the previously stored position change information, that is $C_{i,j} = H_{0,j} * H_{1,j} * \ldots H_{i-1,j} * H_{i,j}$, where $C_{i,j}$ represents a product of the j-th partition position change information in the position change information with the sequence number of (i+1) and the j-th partition position change information in the position change information with the sequence number of i in the second queue . . . until the j-th partition position change information in the position change information with the sequence number of 0. For example, when i=n−1, $C_{n-i,j}$ is equal to the product of $H_{n-1,j}$ and $H_{n-2,j}$ . . . until $H_{0,j}$.

In FIG. 5, the optimized path temporary register stores a weighted average $Q_{i,j}$, and the weighted average $Q_{i,j}$ is obtained by taking the weighted average of the following three: the position information of the partition adjacent to the j-th partition on the image with the sequence number of i in the image queue, the position information of the j-th partition on the frame of image adjacent to the image with the sequence number of i, and $C_{i,j}$ in the original path buffer. The weighted average is expressed by $Q_{i,j}$. Whenever the weighted average is obtained, the $Q_{i,j}$ is temporarily stored in the optimized path buffer, and then overlaid in the optimized path buffer, and recorded as $P_{i,j}$. Obviously, when i=n−1, $P_{n-1,j}$ means that the value is obtained by the weighted average of the following three: the position information of the partition adjacent to the j-th partition on the image at the head of the first queue, the position information of the j-th partition on the preceding frame of image of the frame of image at the head of the queue, and $C_{n-i,j}$ in the original path buffer.

Figure 6:
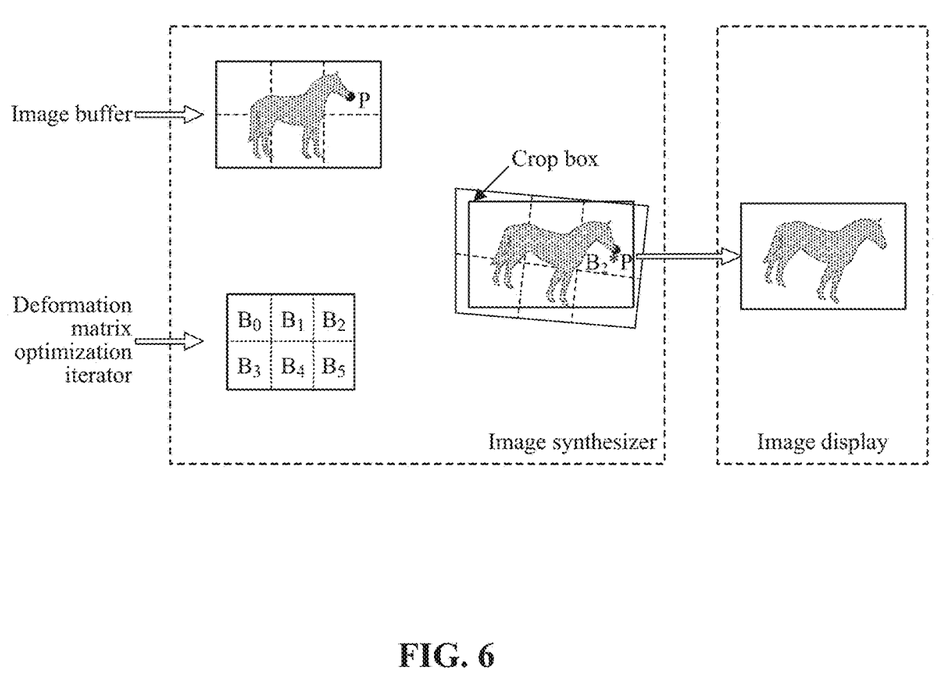
FIG. 6 is a schematic diagram of exemplary image deformation processing, consistent with some embodiments of the present disclosure.

The product result $P_{n-i,j}^{-1} * C_{n-i,j}$ is recorded as $B_j$, and $B_j$ represents the deformation information corresponding to each partition of the image at the head of the queue. For example, when j=1, $B_0$ represents the deformation information corresponding to the first partition of the image at the head of the queue, and similarly, $B_1$ represents the deformation information corresponding to the second partition of the image at the head of the queue . . . and so on, if the image at the head of the queue is divided into 6 partitions, $B_5$ represents the deformation information corresponding to the sixth partition of the image at the head of the queue. $B_0$、$B_1$、$B_2$、$B_3$、$B_4$、$B_5$. The information is combined to form the deformation information corresponding to the image at the head of the queue in the image buffer. Exemplary deformation information corresponding to the image at the head of the queue obtained by a deformation matrix optimization iterator is shown in FIG. 6.

After the deformation information of the preceding image in the first pair of images is acquired through step S103, the deformation information can be used to perform deformation processing on the preceding image, which is included in step S104.

In step S104, the preceding image in the m-th pair of raw images is deformed according to the deformation information corresponding to the preceding image in the m-th pair of raw images to obtain the preceding image in the m-th pair of raw images with jitter removed.

The preceding image in the first pair of images continues to be taken as an example. After the deformation information corresponding to the preceding image in the first pair of images is obtained based on the step illustrated in step S103, when the deformation information is represented by a deformation matrix, the partition of the preceding image is deformed according to the deformation matrix corresponding to the preceding image in the first pair of raw images, that is, the position information of the image is adjusted by using the deformation information obtained in step S103. For example, the deformation matrix of the third partition of the image at the head of the queue in FIG. 6 contains the position information of the feature point P, and there are some differences between the position information of the feature point P existing in the deformation matrix and the position information of the feature point P on the third partition of the image at the head of the queue. In order to eliminate the position difference, the point P on the image at the head of the queue is adjusted to coincide with the position of the feature point P in the deformation information of the third partition, and the position difference can be eliminated. Similarly, the positions of the feature points of other partitions on the image at the head of the queue should also be adjusted to the positions of the corresponding feature points in the deformation information, so that the adjusted image shown in FIG. 6 can be obtained. After the position information of the image at the head of the queue is adjusted, the image outside the deformation information is cropped, and the effect of eliminating the position difference can be achieved.

Embodiments of the current disclosure provides technical solutions for removing video jitter. First, the position information of the feature point pairs in each pair of raw images is determined according to the position information of the feature point pairs in each pair of compressed images. The raw images can become smaller after compression, and the electronic device can perform various processing relatively quickly, accordingly the position information of each feature point pair on the image can be acquired in real time for each image captured. After the position information of the feature point pairs on each image is acquired in real time, the position change information of the subsequent image relative to the preceding image in each pair of raw images is determined in real time correspondingly according to the position information of the feature point pairs in each pair of raw images. After the position change information of the subsequent image relative to the preceding image in the n pairs of raw images is acquired, deformation information corresponding to the preceding image in the first pair of raw images is acquired, and the preceding image is deformed according to the deformation information corresponding to the preceding image in the first pair of raw images to obtain the preceding image with jitter removed. Similarly, other images after the preceding image are sequentially deformed and jitter-removed, thereby achieving real-time jitter removing. At the same time, the technical solutions provided by the embodiments do not rely on other auxiliary devices while removing jitter in real time, and has greater convenience. In contrast, in some conventional systems real-time jitter removing cannot be achieved or external gyros are needed for real-time jitter removing.

Figure 7:
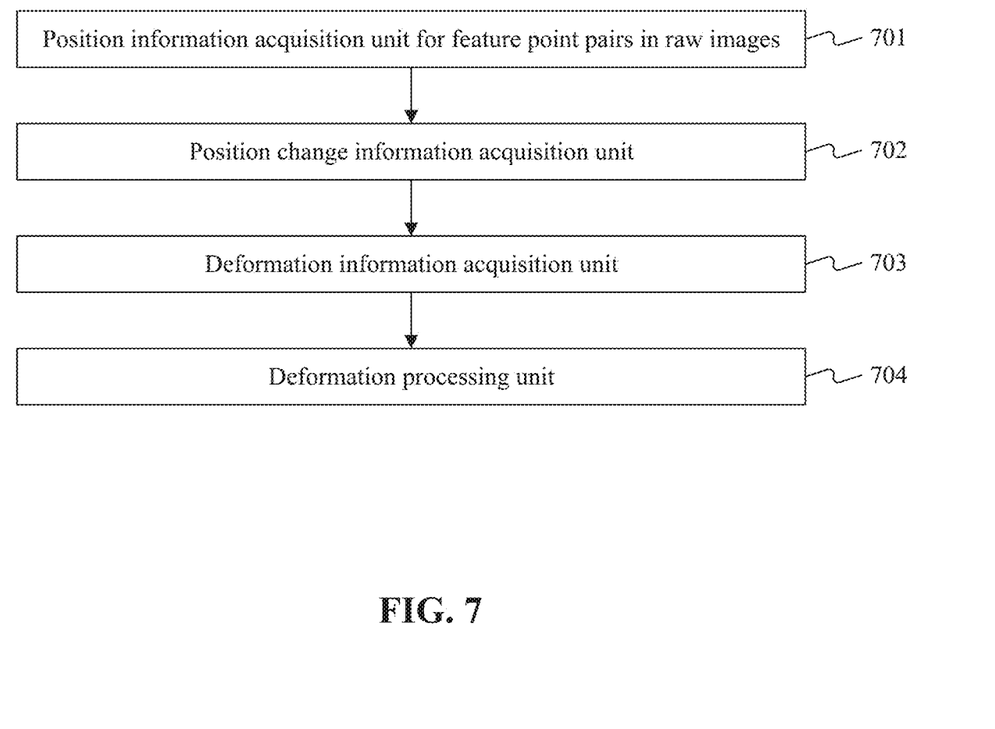
FIG. 7 is a schematic diagram of an exemplary apparatus for removing video jitter, consistent with some embodiments of the present disclosure.

FIG. 7 is a schematic diagram of an exemplary apparatus for removing video jitter, consistent with some embodiments of the present disclosure. The method shown in FIG. 1 can be performed by the exemplary apparatus shown in FIG. 7.

The apparatus can include: a position information acquisition first unit 701, a position change information acquisition unit 702, a deformation information acquisition unit 703, and a deformation processing unit 704.

Position information acquisition first unit 701 is configured to determine position information of feature point pairs in each pair of raw images according to position information of feature point pairs in each pair of compressed images, wherein one feature point pair is composed of two corresponding feature points on two consecutive images in each pair of images, and the raw images are uncompressed images.

Position change information acquisition unit 702 is configured to determine position change information of the subsequent image relative to the preceding image in each pair of raw images according to the position information of the feature point pairs in each pair of raw images.

Deformation information acquisition unit 703 is configured to acquire deformation information corresponding to the preceding image in the m-th pair of raw images according to the position change information of the subsequent image relative to the preceding image in n pairs of raw images, where n and m are positive integers, and m is not greater than n.

Deformation processing unit 704 is configured to deform the preceding image in the m-th pair of raw images according to the deformation information corresponding to the preceding image in the m-th pair of raw images to obtain the preceding image in the m-th pair of raw images with jitter removed.

Optionally, the apparatus further includes: an image storage unit, configured to store the raw images into a first queue; and a position change information storage unit, configured to store the position change information of the subsequent image relative to the preceding image in each pair of raw images into a second queue.

Optionally, the apparatus further includes: a compression unit, configured to compress each pair of raw images by a factor of a number; a feature point determination unit, configured to determine feature points on each image in each pair of compressed images; a feature point pair determination unit, configured to determine two corresponding feature points on the two consecutive images in each pair of compressed images as a feature point pair; and a position information acquisition second unit, configured to determine position information of the feature point pairs in each pair of compressed images.

Optionally, position change information acquisition unit 702 includes: an image partitioning subunit, configured to partition consecutive images in each pair of raw images; a position change information acquisition first subunit, configured to determine position change information of a corresponding partition of the subsequent image relative to a corresponding partition of the preceding image in each pair of raw images according to the position information of the feature point pairs in the corresponding partition of each pair of raw images; and a position change information acquisition second subunit, configured to determine the position change information of the subsequent image relative to the preceding image in each pair of raw images according to the position change information of the corresponding partition of the subsequent image relative to the corresponding partition of the preceding image in each pair of raw images.

Optionally, deformation processing unit 704 includes: a deformation subunit, configured to deform the partition of the preceding image in the m-th pair of raw images according to a deformation matrix corresponding to the preceding image in the m-th pair of raw images; and a cutting subunit, configured to cut an edge of the preceding image in the m-th pair of raw images after deformation.

Embodiments of the present disclosure provide an electronic device for removing video jitter. The electronic device in the embodiment includes: a processor; and a memory for storing a program for removing video jitter, and when the program is read and executed by the processor, the following operations are performed: determining position information of feature point pairs in each pair of raw images according to position information of feature point pairs in each pair of compressed images, wherein one feature point pair is composed of two corresponding feature points on two consecutive images in each pair of images, and the raw images are uncompressed images; determining position change information of the subsequent image relative to the preceding image in each pair of raw images according to the position information of the feature point pairs in each pair of raw images; acquiring deformation information corresponding to the preceding image in the m-th pair of raw images according to the position change information of the subsequent image relative to the preceding image in n pairs of raw images, where n and m are positive integers, and m is not greater than n; and deforming the preceding image in the m-th pair of raw images according to the deformation information corresponding to the preceding image in the m-th pair of raw images to obtain the preceding image in the m-th pair of raw images with jitter removed.

Embodiments of the present disclosure provide a computer-readable medium. The computer-readable medium can be included in the apparatus described in the above-mentioned embodiment; or it can exist alone without being assembled into the apparatus. The above computer-readable medium carries one or more programs. When executed by the apparatus, the above one or more programs cause the apparatus to: determine position information of feature point pairs in each pair of raw images according to position information of feature point pairs in each pair of compressed images, wherein one feature point pair is composed of two corresponding feature points on two consecutive images in each pair of images, and the raw images are uncompressed images; determine position change information of the subsequent image relative to the preceding image in each pair of raw images according to the position information of the feature point pairs in each pair of raw images; acquire deformation information corresponding to the preceding image in the m-th pair of raw images according to the position change information of the subsequent image relative to the preceding image in n pairs of raw images, where n and m are positive integers, and m is not greater than n; and deform the preceding image in the m-th pair of raw images according to the deformation information corresponding to the preceding image in the m-th pair of raw images to obtain the preceding image in the m-th pair of raw images with jitter removed.

It is appreciated that terms "first," "second," and so on used in the specification, claims, and the drawings of the present disclosure are used to distinguish similar objects. These terms do not necessarily describe a particular order or sequence. The objects described using these terms can be interchanged in appropriate circumstances. That is, the procedures described in the exemplary embodiments of the present disclosure could be implemented in an order other than those shown or described herein. In addition, terms such as "comprise," "include," and "have" as well as their variations are intended to cover non-exclusive inclusion. For example, a process, method, system, product, or device including a series of steps or units are not necessarily limited to the steps or units clearly listed. In some embodiments, they may include other steps or units that are not clearly listed or inherent to the process, method, product, or device.

Embodiments of the present disclosure also provide a non-transitory computer readable medium that stores a set of instructions that is executable by at least one processor of a computer to cause the computer to perform the above-mentioned methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. It is understood that multiple ones of the above described modules/units may be combined as one module/unit, and each of the above described modules/units may be further divided into a plurality of sub-modules/sub-units.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for removing video jitter, comprising:
   determining position information of feature point pairs in each pair of raw images according to position information of feature point pairs in each pair of compressed images, wherein one feature point pair is composed of two corresponding feature points on two consecutive images in each pair of images, and the raw images are uncompressed images;
   determining position change information of a subsequent image relative to a preceding image in each pair of raw images according to the position information of the feature point pairs in each pair of raw images;
   acquiring deformation information corresponding to the preceding image in a m-th pair of raw images according to the position change information of the subsequent image relative to the preceding image in n pairs of raw images, wherein n and m are positive integers, and m is not greater than n; and
   deforming the preceding image in the m-th pair of raw images according to the deformation information corresponding to the preceding image in the m-th pair of raw images for removing jitter in the preceding image in the m-th pair of raw images.

2. The method according to claim 1, further comprising:
   storing the raw images into a first queue; and
   storing the position change information of the subsequent image relative to the preceding image in each pair of raw images into a second queue.

3. The method according to claim 1, prior to determining the position information of feature point pairs in each pair of raw images according to the position information of feature point pairs in each pair of compressed images, further comprising:
    compressing each pair of raw images by a factor of a number;
    determining feature points on each image in each pair of compressed images;
    determining two corresponding feature points on the two consecutive images in each pair of compressed images as a feature point pair; and
    determining position information of the feature point pairs in each pair of compressed images.

4. The method according to claim 3, wherein determining the position information of the feature point pairs in each pair of raw images according to the position information of the feature point pairs in each pair of compressed images comprises:
    expanding the position information of the feature point pairs in each pair of compressed images by a factor of the number to obtain the position information of the feature point pairs in each pair of raw images.

5. The method according to claim 1, wherein determining the position information of the feature point pairs in each pair of raw images according to the position information of the feature point pairs in each pair of compressed images comprises:
    partitioning the two consecutive images in each pair of raw images;
    determining position change information of a corresponding partition of the subsequent image relative to a corresponding partition of the preceding image in each pair of raw images according to the position information of the feature point pairs in the corresponding partition of each pair of raw images; and
    determining the position change information of the subsequent image relative to the preceding image in each pair of raw images according to the position change information of the corresponding partition of the subsequent image relative to the corresponding partition of the preceding image in each pair of raw images.

6. The method according to claim 5, wherein the position information is coordinates, the position change information is a transformation matrix, and the deformation information is a deformation matrix.

7. The method according to claim 6, wherein deforming the preceding image in the m-th pair of raw images according to the deformation information corresponding to the preceding image in the m-th pair of raw images comprises:
    deforming the partition of the preceding image in the m-th pair of raw images according to the deformation matrix corresponding to the preceding image in the m-th pair of raw images; and
    cropping a frame edge of the preceding image in the m-th pair of raw images after deformation.

8. An apparatus for removing video jitter, comprising:
    a memory storing a set of instructions; and
    one or more processors configured to execute the set of instructions to cause the apparatus to perform:
        determining position information of feature point pairs in each pair of raw images according to position information of feature point pairs in each pair of compressed images, wherein one feature point pair is composed of two corresponding feature points on two consecutive images in each pair of images, and the raw images are uncompressed images;
        determining position change information of a subsequent image relative to a preceding image in each pair of raw images according to the position information of the feature point pairs in each pair of raw images;
        acquiring deformation information corresponding to the preceding image in a m-th pair of raw images according to the position change information of the subsequent image relative to the preceding image in n pairs of raw images, wherein n and m are positive integers, and m is not greater than n; and
        deforming the preceding image in the m-th pair of raw images according to the deformation information corresponding to the preceding image in the m-th pair of raw images for removing jitter in the preceding image in the m-th pair of raw images.

9. The apparatus according to claim 8, wherein the one or more processors configured to execute the set of instructions to cause the apparatus to further perform:
    storing the raw images into a first queue; and
    storing the position change information of the subsequent image relative to the preceding image in each pair of raw images into a second queue.

10. The apparatus according to claim 8, wherein the one or more processors configured to execute the set of instructions to cause the apparatus to further perform:
    compressing each pair of raw images by a factor of a number;
    determining feature points on each image in each pair of compressed images;
    determining two corresponding feature points on the two consecutive images in each pair of compressed images as a feature point pair; and
    determining position information of the feature point pairs in each pair of compressed images.

11. The apparatus according to claim 10, wherein determining the position information of the feature point pairs in each pair of raw images according to the position information of the feature point pairs in each pair of compressed images comprises:
    expanding the position information of the feature point pairs in each pair of compressed images by a factor of the number to obtain the position information of the feature point pairs in each pair of raw images.

12. The apparatus according to claim 8, wherein determining the position information of the feature point pairs in each pair of raw images according to the position information of the feature point pairs in each pair of compressed images comprises:
    partitioning the two consecutive images in each pair of raw images;
    determining position change information of a corresponding partition of the subsequent image relative to a corresponding partition of the preceding image in each pair of raw images according to the position information of the feature point pairs in the corresponding partition of each pair of raw images; and
    determining the position change information of the subsequent image relative to the preceding image in each pair of raw images according to the position change information of the corresponding partition of the subsequent image relative to the corresponding partition of the preceding image in each pair of raw images.

13. The apparatus according to claim 12, wherein the position information is coordinates, the position change information is a transformation matrix, and the deformation information is a deformation matrix.

14. A non-transitory computer-readable storage medium that stores a set of instructions that is executable by at least one processor of a computer to cause the computer to perform a method for removing video jitter, the method comprising:
- determining position information of feature point pairs in each pair of raw images according to position information of feature point pairs in each pair of compressed images, wherein one feature point pair is composed of two corresponding feature points on two consecutive images in each pair of images, and the raw images are uncompressed images;
- determining position change information of a subsequent image relative to a preceding image in each pair of raw images according to the position information of the feature point pairs in each pair of raw images;
- acquiring deformation information corresponding to the preceding image in a m-th pair of raw images according to the position change information of the subsequent image relative to the preceding image in n pairs of raw images, wherein n and m are positive integers, and m is not greater than n; and
- deforming the preceding image in the m-th pair of raw images according to the deformation information corresponding to the preceding image in the m-th pair of raw images for removing jitter in the preceding image in the m-th pair of raw images.

15. The non-transitory computer readable medium of claim 14, wherein the at least one processor is configured to execute the set of instructions to cause the computer to further perform:
- storing the raw images into a first queue; and
- storing the position change information of the subsequent image relative to the preceding image in each pair of raw images into a second queue.

16. The non-transitory computer readable medium of claim 14, wherein prior to determining the position information of feature point pairs in each pair of raw images according to the position information of feature point pairs in each pair of compressed images, the at least one processor is configured to execute the set of instructions to cause the computer to further perform:
- compressing each pair of raw images by a factor of a number;
- determining feature points on each image in each pair of compressed images;
- determining two corresponding feature points on the two consecutive images in each pair of compressed images as a feature point pair; and
- determining position information of the feature point pairs in each pair of compressed images.

17. The non-transitory computer readable medium of claim 16, wherein determining the position information of the feature point pairs in each pair of raw images according to the position information of the feature point pairs in each pair of compressed images comprises:
- expanding the position information of the feature point pairs in each pair of compressed images by a factor of the number to obtain the position information of the feature point pairs in each pair of raw images.

18. The non-transitory computer readable medium of claim 14, wherein determining the position information of the feature point pairs in each pair of raw images according to the position information of the feature point pairs in each pair of compressed images comprises:
- partitioning the two consecutive images in each pair of raw images;
- determining position change information of a corresponding partition of the subsequent image relative to a corresponding partition of the preceding image in each pair of raw images according to the position information of the feature point pairs in the corresponding partition of each pair of raw images; and
- determining the position change information of the subsequent image relative to the preceding image in each pair of raw images according to the position change information of the corresponding partition of the subsequent image relative to the corresponding partition of the preceding image in each pair of raw images.

19. The non-transitory computer readable medium of claim 18, wherein the position information is coordinates, the position change information is a transformation matrix, and the deformation information is a deformation matrix.

20. The non-transitory computer readable medium of claim 19, wherein deforming the preceding image in the m-th pair of raw images according to the deformation information corresponding to the preceding image in the m-th pair of raw images comprises:
- deforming the partition of the preceding image in the m-th pair of raw images according to the deformation matrix corresponding to the preceding image in the m-th pair of raw images; and
- cropping a frame edge of the preceding image in the m-th pair of raw images after deformation.

* * * * *